Jan. 26, 1937.　　　B. L. QUARNSTROM　　　2,068,932
FASTENING DEVICE
Filed Aug. 5, 1935
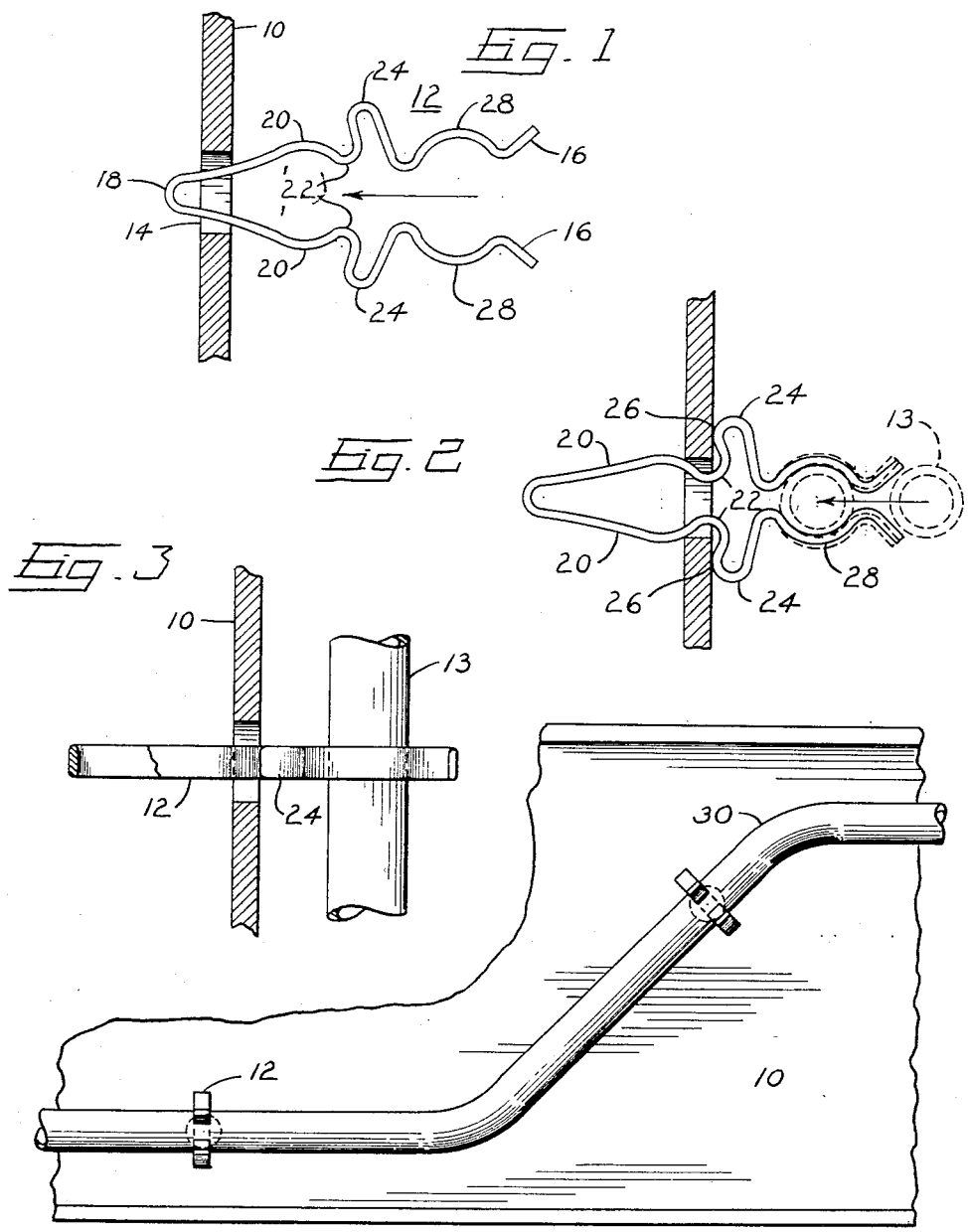
INVENTOR
BERT L. QUARNSTROM
BY
Parker & Burton
ATTORNEY Patented Jan. 26, 1937

2,068,932

UNITED STATES PATENT OFFICE 2,068,932

FASTENING DEVICE

Bert L. Quarnstrom, Grosse Pointe Farms, Mich.

Application August 5, 1935, Serial No. 34,716

3 Claims. (Cl. 24—73)

This invention relates to fasteners and particularly to spring clip fasteners.

An object is to provide a spring fastener having spaced apart spring grip portions, here shown as opposite end portions, one of which portions is adapted to be releasably received within an aperture in a supporting member to frictionally, grippingly, securely engage said member under inherent, expansible, spring tension, and the other portion is adapted to releasably receive and grippingly embrace a supported member under contractile spring tension, inherent in the structure and accentuated by imposition of additional tension due to engagement of the first mentioned grip portion within the aperture of the supporting member.

This invention has particular reference to the automobile art although not limited thereto wherein, in the past, tubing, wire conduits and other narrow and elongate objects have been assembled on the automobile by clamps or the like bolted to the supports. In actual assembly practice this fastening construction consumed a considerable amount of time and expense.

It is an object of the present invention to provide a simple, inexpensive spring clip fastener which may be formed of flat spring stock or even wire so formed and shaped as to have one spring grip portion releasably insertable into a provided aperture in a supporting member to securely engage the same to support another element therefrom. The fastener is provided with a second spring grip portion which is adapted to releasably receive and grippingly embrace a supported member to securely hold the same for support by said supporting member.

The construction is such that the insertion of the one grip portion of the clip into the aperture within the supporting member causes the other grip portion of the clip to more snugly and tightly embrace the supported member. It is shown as embodied in a clip adapted to secure tubing wiring, or the like, to an automobile chassis frame.

Other objects, advantages, and meritorious features will more fully appear from the following description, appended claims, and accompanying drawing, wherein:

Figure 1 is a side elevation of the fastener and the support showing the manner of insertion, Fig. 2 is a side elevation of the fastener showing it fully inserted through the opening in the support and the manner of inserting a supported element into the fastener to be carried thereby, Fig. 3 is a cross-sectional view through the fastener, and Fig. 4 is a view showing the manner of employing a series of fasteners for securing a section of tubing to a support.

To secure tubing, such as a gasoline line, or wire conduit, it has been the practice to provide openings in the supporting frame and secure the tube or conduit thereto by means of a clamp bolted through the openings. The present invention provides a plurality of devices whereby a tube or similar part may be quickly assembled upon the frame. These devices consist essentially of spring clips bent generally in the form of a hairpin or U. Each leg of the U is provided with similar convolutions which assist in retaining the devices in the frame openings and which form a section for grasping the object to be supported.

A series of spaced openings are provided in the frame, and into each is inserted one of these clips. Each clip is compressed by the insertion including the clamping section which almost closes by this action. The tube or conduit is then brought to a point opposite the extremity of the legs of the clip and forced therebetween. The legs yield to the pressure and allow the tube to enter the clamping section and be resiliently securely held therein.

In the drawing the support or frame through which the fastening devices are inserted is indicated at 10. The fastening elements or clips are indicated generally as 12. The supported tube is indicated as 13. The clip is insertable as shown in Fig. 1 through an opening 14 in the element 10.

The fastening device 12 comprises a strip of resilient material such as spring metal or wire generally defined as a narrow strip of spring stock. The strip is bent upon itself to form a pair of similarly shaped spaced complementary legs 16—16. The closed end 18 forms the leading or insertable end of the device as indicated by the arrow in Fig. 1. The leading end 18 is of less width at the tip than the width of the opening 14 but the legs 16 are sprung outwardly to a distance greater than the width of the opening as is clearly apparent in Fig. 1.

Each leg has a section 20 which tapers gradually inwardly toward the bent end 18. Just prior to this tapered section, the legs converge toward one another at 22 to form a throat about which the side walls of the opening are adapted to press when the fastener is inserted to its full extent as shown in Fig. 2. The width of the throat is normally greater than that of the opening 14 so that when the fastener is inserted the side walls of the opening compress the throat and draw the free ends of the legs into closer proximity. This will be apparent upon comparing Fig. 1 with Fig. 2.

Each leg section 16 is provided with a loop portion 24 which bends backwardly slightly to overlie the throat portion 22. These loops form abutting structures which prevent further insertion of the clip into the opening and they are adapted to contact the supporting frame 10 as indicated at 26 in Fig. 2. The throat section 22 is so constructed that when the clip is inserted both the loop section and the tapered section 20 on each leg tend to pinch the opposite sides of the frame support therebetween. By this action, the loop sections are urged laterally toward the free ends of the legs. That is to say, the position of the frame about the throat not only compresses the legs 16 but at the same time urges the loops into a more vertical position. This last action accentuates the compression of the legs and assists in further retaining the legs against forces tending to spread them.

The free ends of the legs have a gripping portion 28 which is adapted to embrace a tubing or similar shaped object. It is obvious that this gripping section can be formed to fit around any kind of an object presented to the clip. The extremities of the leg are outwardly flared to allow the legs to spread when an object, such as the tubing shown in Figs. 2 and 3 is pressed thereagainst.

To secure a lengthy object, such as a tube, a series of spaced holes are formed in the frame where it is desired the tube shall run. A clip is then inserted in each hole until it is resiliently retained therein. It is best that the clips be inserted so that they will extend traversely to the direction of the tube which is about to be assembled. The tube is now brought up to the outwardly flared ends of the clip and pressed thereagainst. The legs of the clip will yieldingly spread away from one another and permit the tube to enter the gripping section 28. At this point, the gripping section will embrace the tube and hold it securely in place. The presence of the tube between the leg sections acts to spread the free ends of the legs and increases the pressure of the loop portion 24 as well as the throat portion against the support. This reacts to urge the gripping sections into a tighter grip upon the tube.

In Fig. 4 there is shown a tube section 30 gripped between a series of clips 12 fastened on a support 10. The support may represent a chassis frame of an automobile and the tube a part of the gasoline line.

When the spring clip has secured the supported member to the supporting member or frame, spring tension is developed in three distinct places which mutually react with one another to increase the gripping force of the clip upon the frame and upon the supported member. In the first place, the throat section 22 is pinched by the side walls of the opening in the frame. This draws the legs into close proximity and causes the clip to grippingly engage the frame. Secondly, the loop sections 24 resiliently bear on the surface of the frame and stiffen the free ends of the legs against spreading. Thirdly, the presence of the supported member between the legs spreads these legs apart and presses the throat section into tighter engagement with the frame and similarly presses the loop sections back against the surface of the frame. It is therefore seen that all three of these tensioning areas mutually assist one another in their respective functions.

What I claim is:

1. A spring clip formed of a narrow strip of spring stock bent generally into the form of a U having complementary resilient legs diverging as they extend away from the closed end of the U and then converging to a contracted throat, said legs shaped to provide a second contracted throat spaced from the first contracted throat toward the free ends of the legs by complementary loops formed in said legs extending outwardly to a maximum spread and slightly overhanging the first mentioned contracted throat, said legs provided between the second contracted throat and the free ends of the legs with complementary outwardly convex gripping portions adapted to be spread resistingly apart to receive an element therebetween.

2. A spring clip formed of a narrow strip of spring stock bent generally into the form of a U having complementary resilient legs diverging as they extend away from the closed end of the U and then converging to a contracted throat, said legs shaped adjacent to their free ends to provide complementary outwardly convex tube gripping portions terminating on the side adjacent to the closed end of the U in a second contracted throat spaced toward the free ends of the legs from the first contracted throat, said legs being shaped between said two contracted throat portions providing complementary loops having substantially parallel legs extending outwardly and substantially normal to the longitudinal centerline of the fastener and to the maximum spread of the fastener and spacing said two contracted throat portions apart.

3. A spring clip formed of spring metal bent generally into the form of a U having complementary resilient legs, said legs provided with cooperating conduit gripping bends adjacent to their free ends and provided with cooperating aperture engaging bends adjacent to their closed end, and provided intermediate said aperture engaging bends and conduit engaging bends and spacing the same apart with complementary relatively narrow generally U-shaped loops which form with the aperture engaging bends angles so shaped that lines bisecting the same form acute angles with the closed end portion of the longitudinal centerline of the clip.

BERT L. QUARNSTROM.